No. 752,994. Patented February 23, 1904.

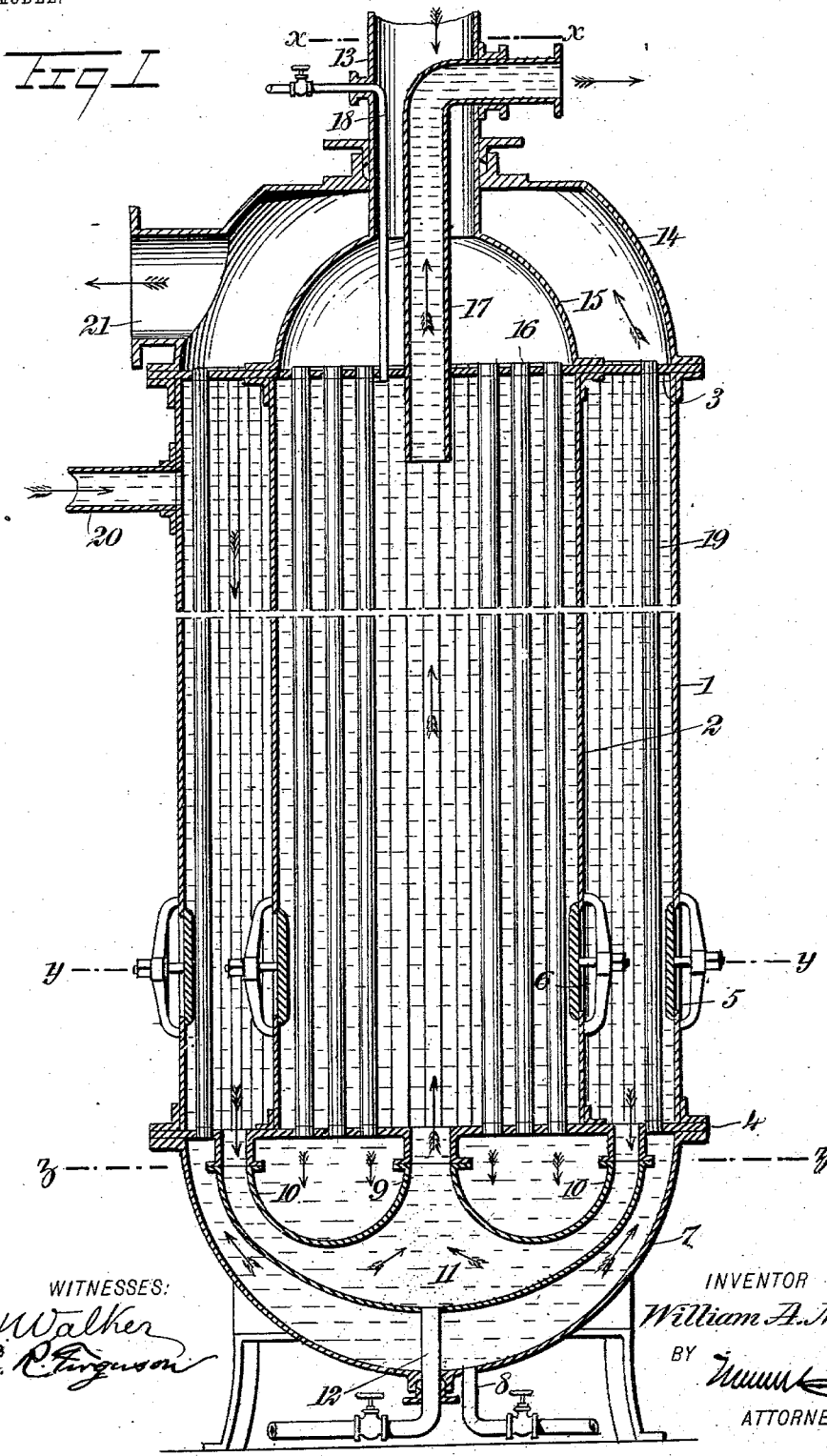

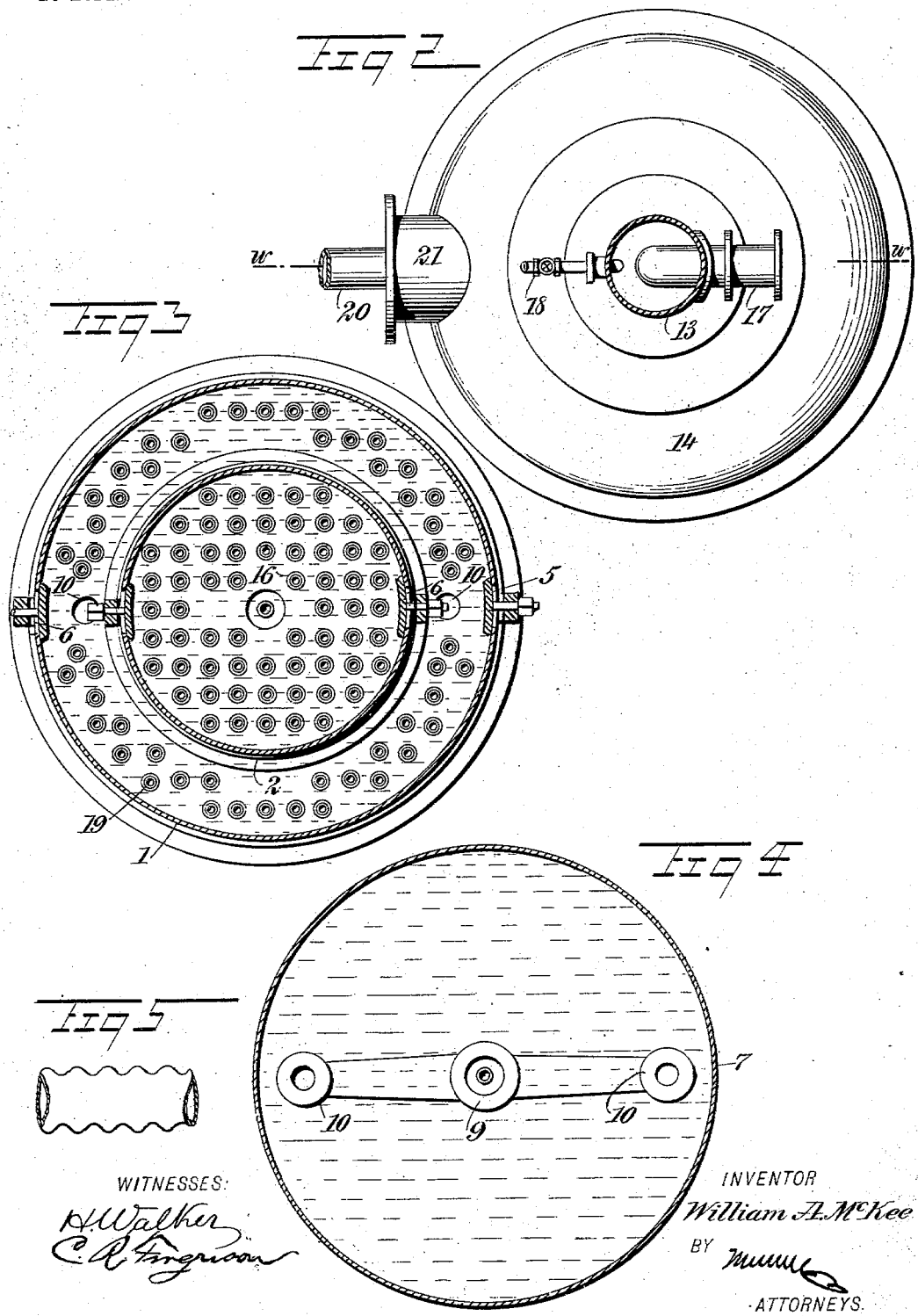

UNITED STATES PATENT OFFICE.

WILLIAM ANDREW McKEE, OF HINCKLEY, NEW YORK.

FEED-WATER HEATER.

SPECIFICATION forming part of Letters Patent No. 752,994, dated February 23, 1904.

Application filed June 2, 1903. Serial No. 159,811. (No model.)

*To all whom it may concern:*

Be it known that I, WILLIAM ANDREW MCKEE, a citizen of the United States, and a resident of Hinckley, in the county of Oneida and State of New York, have invented a new and Improved Feed-Water Heater, of which the following is a full, clear, and exact description.

This invention relates to improvements in feed-water heaters for steam-boilers, an object being to provide a device of this character in which the water is rapidly heated by exhaust-steam and in which the water is purified of sediment, oil, and the like.

I will describe a feed-water heater embodying my invention and then point out the novel features in the appended claims.

Reference is to be had to the accompanying drawings, forming a part of this specification, in which similar characters of reference indicate corresponding parts in all the figures.

Figure 1 is a sectional elevation on the line *w w* of Fig. 2 of a feed-water heater embodying my invention. Fig. 2 is a plan view thereof, partly in section, on the line *x x* of Fig. 1. Fig. 3 is a section on the line *y y* of Fig. 1. Fig. 4 is a section on the line *z z* of Fig. 1, and Fig. 5 is a section of one of the tubes employed.

Referring to the drawings, 1 designates the outer shell or cylinder, and 2 the inner shell or cylinder. The upper ends of these cylinders are attached to a tube-plate 3, and the lower ends are attached to a tube-plate 4. The space between the cylinders 1 and 2 forms a water-chamber, as will be hereinafter described. The cylinders are respectively provided with manholes 5 6, so that the tubes or interiors of the cylinders may be readily reached for cleaning and the like.

Attached to the tube-plate 4 is a header 7, which forms a chamber for water, and this chamber is provided with a water and oil drip pipe 8. The chamber between the cylinders 1 and 2 communicates with the interior of the cylinder 2 through a pipe having a central portion 9 leading into said cylinder 2 and lateral branches 10 leading into the space between the two cylinders. This pipe is enlarged at its lower curved portion to form a chamber 11 to receive settlings from the water, and the said settlings may be drawn off through a pipe 12. An inlet-pipe 13 for exhaust-steam leads through a stuffing-box arranged in a dome 14, attached to the upper tube-plate, and this inlet-pipe 13 communicates with a semicylindrical dome 15, arranged directly over the cylinder 2, and is designed to spread the exhaust-steam to the several tubes 16, providing communication between the chamber of said dome 15 and the bottom chamber or header 7. An outlet-pipe 17 leads from the cylinder 2 through the plate 3 and out to a stuffing-box at one side of the pipe 13. This pipe 17 of course carries the feed-water in its purified state to the boiler. Also communicating with the interior of the cylinder 2 and leading out through one side of the pipe 13 is a scum-blow-off tube 18, and tubes 19 extend through the chamber between the cylinders 1 and 2 and provide communication between the chamber of the dome 14 and the chamber 7. It may be here stated that preferably the several pipes are circumferentially corrugated, as indicated in Fig. 5, and the ends of the tubes are to be expanded in the tube-plates. By corrugating the tubes they may be readily expanded without danger of breaking the joints.

In the operation cold water is admitted through a pipe 20 and through the branches 10 into the cylinder 2. The exhaust-steam passing through the tubes 16 will rapidly heat the water passing up through the cylinder, and the heated and cleansed feed-water will pass off to the boiler through the pipe 17. The exhaust from the tubes 16 passes into the chamber 7 and thence up through the tubes 19 and out through a pipe 21. The scum and oil that may collect at the upper portion of the water in the cylinder 2 may be blown off through the tube 18, and of course sediment, such as mud, may be discharged through the pipe 12.

It will be noted that by having the cold water on the outside of the heater it makes it possible to retain to a greater degree the heat units. The feed-water leaves the heater where the steam is the hottest.

Having thus described my invention, I claim as new and desire to secure by Letters Patent—

1. In a feed-water heater comprising an outer cylinder, an inner cylinder, a chamber below said cylinders, a pipe providing communication from the space between the two cylinders and the interior of the inner cylinder, tubes extended through the inner cylinder and communicating with said lower chamber, a dome arranged over the upper ends of said tubes and having communication with an inlet-pipe for exhaust, a feed-water-outlet pipe leading from the inner cylinder, an outlet-chamber dome secured upon the upper end of the cylinders, tubes providing communication between said chamber and the said lower chamber, and an inlet-pipe communicating with the space between the two cylinders.

2. A feed-water heater comprising an outer cylinder, an inner cylinder, a chamber below said cylinders and closed from the space between the outer cylinder and the inner cylinder, a pipe providing communication from the space between the cylinders to the inner cylinder, tubes leading through the inner cylinder to said chamber, and tubes leading from said chamber through the space between the cylinders.

3. A feed-water heater comprising an outer cylinder, an inner cylinder, a chamber at the lower end of the heater, a dome arranged to embrace the upper end of the inner cylinder, tubes providing communication between said dome and the said chamber, a feed-pipe leading into said dome, an outlet-pipe for feed-water leading from said inner cylinder, a blow-off tube leading from said inner cylinder, a pipe providing communication from the space between the inner and outer cylinders to the interior of the inner cylinder, an outlet-chamber dome, and tubes providing communication between the first-named chamber and said outlet-chamber dome.

4. A feed-water heater comprising an inner cylinder, an outer cylinder, a branch pipe providing communication between the space formed between the two cylinders and the interior of the inner cylinder, said branch pipe having a settling-chamber, a discharge-pipe leading therefrom, a bowl-shaped header attached to the lower end of the cylinders, a spreader-dome arranged over the inner cylinder, tubes providing communication between said spreader-dome and the bowl-shaped header, and exhaust discharge-tubes leading upward from said bowl-shaped header.

5. In a feed-water heater, an outer cylinder, an inner cylinder, a pipe having a branch leading into the inner cylinder, branches leading into the space between the cylinders, the said pipe being enlarged at its lower portion to form a settlings-receiver, exhaust-tubes leading through the space between the cylinders, and circulating-tubes leading through the inner cylinder.

In testimony whereof I have signed my name to this specification in the presence of two subscribing witnesses.

WILLIAM ANDREW McKEE.

Witnesses:
Wm. J. Wanless,
Geo. M. McKee.